US007578424B2

(12) United States Patent
Szela et al.

(10) Patent No.: US 7,578,424 B2
(45) Date of Patent: Aug. 25, 2009

(54) METHOD OF JOINING A MICROWAVE TRANSPARENT COMPONENT TO A HOST COMPONENT

(75) Inventors: Edward R. Szela, West Springfield, MA (US); John A. Leogrande, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 345 days.

(21) Appl. No.: 11/515,537

(22) Filed: Sep. 5, 2006

(65) Prior Publication Data

US 2008/0054048 A1 Mar. 6, 2008

(51) Int. Cl.
*B23K 35/22* (2006.01)

(52) U.S. Cl. ........................................ 228/122; 148/22

(58) Field of Classification Search ................ 228/101, 228/248, 121, 122.1, 246, 245, 262.1; 428/472, 428/408, 367, 368

See application file for complete search history.

(56) References Cited

U.S. PATENT DOCUMENTS 4,757,292 A 7/1988 Basil, Jr. et al.
5,240,491 A * 8/1993 Budinger et al. .............. 75/255
5,437,737 A 8/1995 Draghi et al.
5,937,708 A 8/1999 Ito et al.
6,436,545 B1 8/2002 Tanahashi et al.
6,616,032 B1 * 9/2003 Gasse et al. .............. 228/248.1
2002/0034652 A1 3/2002 Walz et al.
2002/0051848 A1 5/2002 Li
2002/0060091 A1 5/2002 Naba et al.
2005/0014010 A1 1/2005 Dumm et al.
2005/0040210 A1 2/2005 Sandin

OTHER PUBLICATIONS

"Expanding the frontier of thin film innovation" at www.ultrasource.com, pp. 1-11, ©2005 UltraSource Incorporated.

* cited by examiner

*Primary Examiner*—Kuang Y. Lin
*Assistant Examiner*—Ahmed Abdel Rahman
(74) *Attorney, Agent, or Firm*—Carlson, Gaskey & Olds

(57) ABSTRACT

A method of joining a microwave transparent component 36 to a host component 34 or 18 includes the steps of applying a Titanium-Tungsten (TiW) coating 44 to the microwave transparent component, applying a metal layer 46 over the TiW coating and brazing the microwave transparent component to the host. In a more detailed embodiment, the microwave transparent component is a ceramic component and the host component is a nonceramic component. In an even more detailed embodiment, the nonceramic component is made of a nickel base alloy and the metal layer is a nickel plating. A turbine engine component comprising a microwave nontransparent host 34 or 18 and a microwave transparent window 36 brazed to the host is also described.

1 Claim, 3 Drawing Sheets

METHOD OF JOINING A MICROWAVE TRANSPARENT COMPONENT TO A HOST COMPONENT

TECHNICAL FIELD

This invention relates to joining a microwave transparent component to a host and is described in the context of brazing a ceramic, microwave transparent window to a nickel base window frame or to a nickel base outer airseal for a gas turbine engine.

BACKGROUND

A typical gas turbine engine includes a turbine module comprising a hub, which is rotatable about an engine axis, and an array of blades projecting radially outwardly from the hub. The turbine module also includes a case with a set of circumferentially distributed outer airseals mounted thereon so that the case and the airseals circumscribe the blade array. The airseals define the radially outermost boundary of a flowpath for a working medium fluid. The airseals are often made of a nickel base alloy or superalloy. The airseals are spaced radially from the radially outermost tips of the blades to define a radial clearance gap. During engine operation, mechanical and thermal influences can cause the radial size of the gap to change. It is desirable to control the size of the gap by, for example, impinging cool air on the case to decrease its diameter or withholding the cool air to allow the case diameter to expand. Although such control can be open loop, it may also be desirable to effect closed loop control of the clearance gap. Closed loop control requires a clearance sensing system for measuring the radial size of the gap.

One suitable clearance sensing system is a microwave system that uses microwave radiation to determine the radial size of the clearance gap. Such a system includes a waveguide residing radially outboard of the outer airseals and an associated electronics package and algorithms for signal processing. One or more selected outer airseals includes a subassembly comprising a microwave transparent ceramic window installed in a window frame made of a nickel base alloy or superalloy. The subassembly occupies an opening in the selected outer airseal and is hermetically joined to the outer airseal to prevent leakage through the opening. When the turbine is assembled, the window is axially and circumferentially aligned with the waveguide so that the clearance sensing system can detect the proximity of the blade tips. Alternatively, the ceramic window may be joined directly to the airseal without an intervening window frame. Either configuration presents the problem of joining the ceramic window to a nonceramic host, either the nickel base window frame or the nickel base outer airseal. The joint must be able to withstand the challenging conditions, including extreme temperatures, encountered in the turbine module of a gas turbine engine.

What is needed is convenient, cost effective method of forming a secure joint between a ceramic component and a nonceramic host.

SUMMARY

One embodiment of the joining method described herein includes applying a Titanium-Tungsten (TiW) coating to a microwave transparent component, applying a metal layer over the TiW coating and brazing the microwave transparent component to a host component.

In a more detailed embodiment, the microwave transparent component is a ceramic component and the host component is a nonceramic component.

In another more detailed embodiment, the nonceramic component is made of a nickel base alloy and the metal layer is a nickel plating.

Another more detailed embodiment includes a preparatory step of nickel plating or fluoride ion treating the nonceramic component prior to brazing.

The foregoing and other features of the various embodiments of the joining method and of the turbine engine components resulting therefrom will become more apparent from the following detailed description and the accompanying drawings.

DETAILED DESCRIPTION

Figure 1:
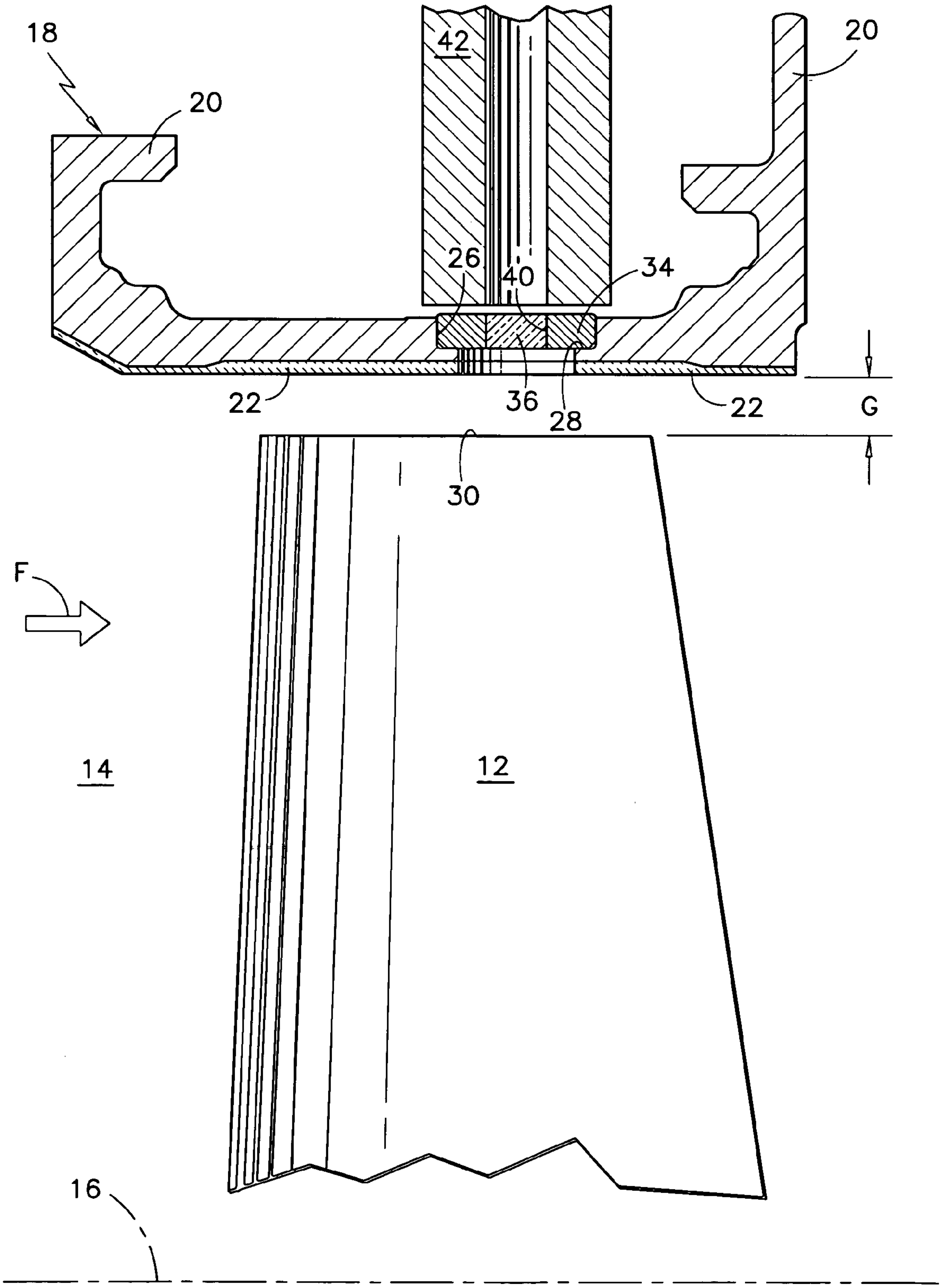
FIG. 1 is a cross sectional side elevation view of an outer airseal, a turbine blade and a microwave waveguide in a turbine module of a gas turbine engine, the outer airseal including an opening occupied by a window frame and a microwave transparent window.
Figure 2:
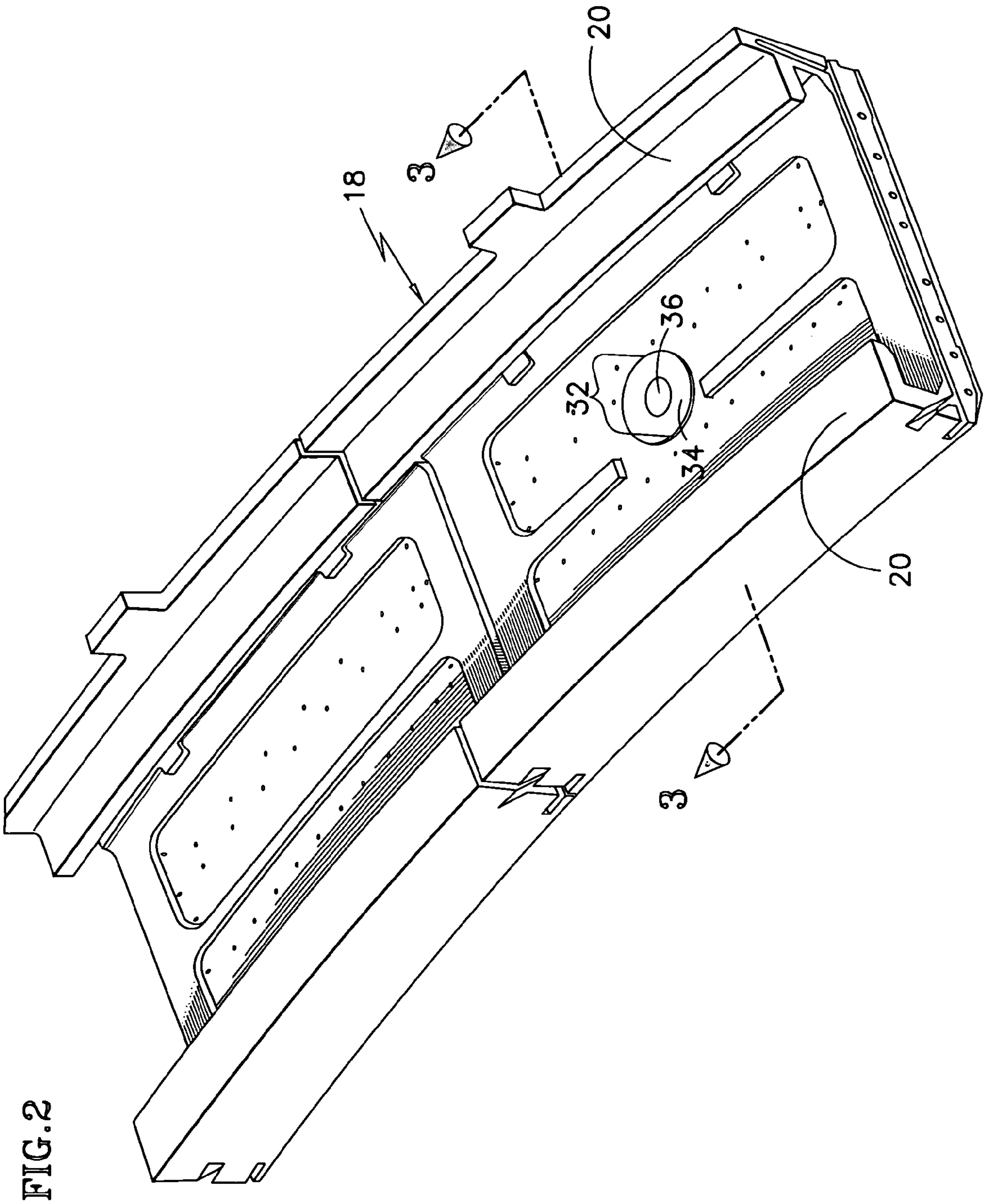
FIG. 2 is a perspective view of two circumferentially adjacent outer airseals, one of the airseals including an opening occupied by a window frame and a microwave transparent window.

Referring to FIGS. 1 and 2, a turbine module for a gas turbine engine includes an array of blades, such as representative blade 12, spanning radially across a working medium flowpath 14. The blades are connected to a rotatable hub, not shown. During engine operation, the blades extract energy from a stream of hot working medium fluid F causing the hub to rotate about engine axis 16.

The turbine module also includes a set of circumferentially distributed outer airseals 18 each having hooks 20 for mounting the airseal on a case, not shown. The airseal is made of a temperature tolerant substrate alloy. Suitable alloys include nickel and cobalt base alloys and superalloys. An example of one specific suitable alloy is a nickel base superalloy having the composition disclosed in U.S. Pat. No. 4,719,080. This and other alloys typically used to make outer airseals are nontransparent to microwave radiation. The airseal also includes a coating 22 applied to the substrate to impart additional thermal tolerance and/or to protect the substrate from oxidation and corrosion and abrasion. A circular opening 26 with a shoulder 28 penetrates selected outer airseals. When the turbine module is assembled, the tips 30 of the blades are spaced from the outer airseal by a clearance gap G, shown highly exaggerated in FIG. 1.

A subassembly 32 comprising a window frame 34 and a cylindrical window 36 occupies the opening 26 in the outer airseal. The window frame is made of the nickel base alloy described above and has a circular hole 40 for receiving the window. The window is made of a microwave transparent material such as a ceramic. Ceramics having suitable microwave transparency include alumina, quartz, silicon nitride, zirconia toughened alumina and sapphire. Other suitable microwave transparent materials include materials, whether ceramic or not, having a dielectric constant of no more than about 11.5, although materials having a higher dielectric constant may be satisfactory if the electronics package and algorithms in the clearance sensing system is configured to compensate for the diminished microwave transparency associated with the higher dielectric constant. One suitable nonceramic material having acceptable microwave transparency is diamond. The window frame 34 is brazed to the outer airseal 18. The ceramic window 36 is brazed to the host nickel base window frame 34 as described below.

The turbine module also includes a waveguide 42 having a circular external cross section. The waveguide 42 is a component of a microwave clearance sensing system that uses microwave radiation and processing circuitry to determine the clearance gap G. When the turbine is assembled, the window 36 is axially and circumferentially aligned with the waveguide so that the clearance sensing system can detect the proximity of the blade tips 30.

Figure 3:
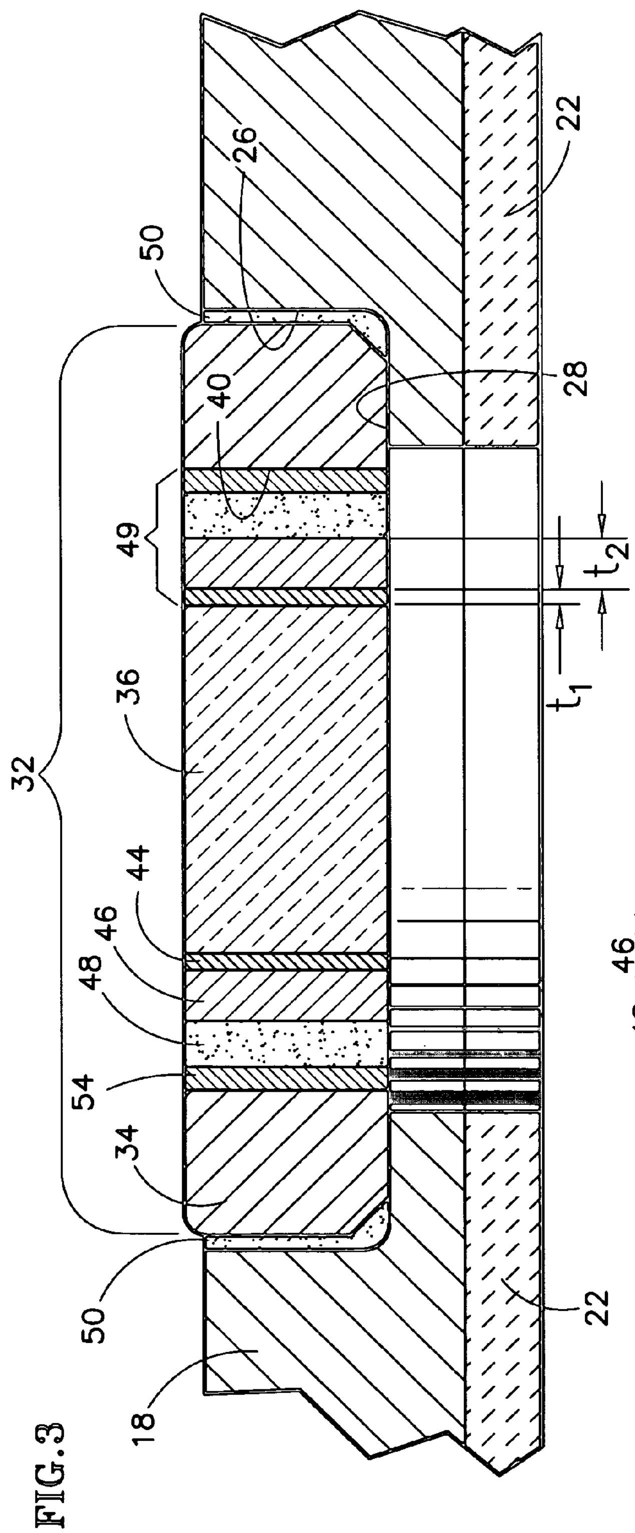
FIG. 3 is a schematic view taken in the direction 3-3 of FIG. 2.

Referring additionally to FIG. 3, the joining of the ceramic window 36 to the nickel base alloy window frame 34 to produce subassembly 32 is accomplished by first applying a titanium-tungsten (TiW) coating 44 to the perimeter of the window to a thickness $t_1$ of about $1.2\times10^{-6}$ to $2.0\times10^{-6}$ inches (0.00003 to 0.00005 millimeters or about 300 to 500 Angstroms). The coating is preferably applied by sputter coating, but may be applied by other suitable techniques including physical vapor deposition (PVD). A metal layer 46 is then applied (e.g. by plating) over the TiW coating to a thickness $t_2$ of about 0.0008-0.0012 inches (approximately 0.020-0.030 millimeters). The metal layer is preferably nickel to be compatible with the nickel alloy substrate from which the host window frame 34 is made. The nickel layer 46 helps prevent formation of oxides that would inhibit wetting action (capillary action) of a subsequently applied braze alloy. The TiW coating provides electrical conductivity to facilitate the nickel plating.

A braze alloy 48, which may be in the form of a paste, tape, powder or other suitable form is introduced between the coated, plated window and the window frame. One suitable braze alloy is American Welding Society AWS BNi-9 having a composition by weight of about 15% chromium, 3.6% boron, remainder nickel. A second suitable braze alloy has a composition described in U.S. Pat. No. 5,437,737, the contents of which are incorporated herein by reference, specifically the composition identified at "Table II Second Particulate Component" and whose composition by weight is reproduced below:

| | Weight Percent | |
|---|---|---|
| Element | Example | Broad |
| Chromium | 8.50%-9.50% | 5.00%-15.00% |
| Cobalt | 7.50%-8.50% | 0.00%-20.00% |
| Tungsten | 3.75%-4.25% | 0.00%-12.00% |
| Aluminum | 1.75%-2.25% | 1.00%-5.00% |
| Titanium | 0.00%-0.10% | 0.00%-4.00% |
| Boron | 2.75%-3.25% | 1.00%-4.00% |
| Silicon | 0.00%-0.10% | 0.00%-3.00% |
| Hafnium | 0.75%-1.25% | 0.00%-2.00% |
| Nickel | remainder | remainder |

A third suitable braze alloy is a blend of a first constituent whose composition is that of the above described second suitable braze alloy and a second constituent having a composition described in U.S. Pat. No. 5,437,737, specifically the composition identified at "Table II First Particulate Component" and whose composition by weight is reproduced below:

| | Weight Percent | |
|---|---|---|
| Element | Example | Broad |
| Carbon | 0.13%-0.17% | 0.005%-0.250% |
| Chromium | 8.00%-8.80% | 5.10%-15.00% |
| Cobalt | 9.00%-11.00% | 0.00%-20.00% |
| Molybdenum | 0.50%-0.80% | 0.00%-5.00% |
| Tantalum | 2.80%-3.30% | 0.00%-6.00% |
| Tungsten | 9.50%-10.50% | 0.00%-12.00% |
| Titanium | 0.90%-1.20% | 0.00%-4.00% |
| Aluminum | 5.30%-5.70% | 1.00%-5.00% |
| Boron | 0.010%-0.020% | 0.00%-0.05% |
| Hafnium | 1.20%-1.60% | 0.00%-2.00% |
| Zirconium | 0.03%-0.08% | 0.00%-1.00% |
| Nickel | remainder | remainder |

Preferably, the first constituent makes up between about 40% and 95% of the third braze alloy and the second constituent makes up essentially the balance of the third braze alloy, i.e. between about 60% and 5% of the blend.

The subassembly 32 is then exposed to a thermal cycle to create a braze joint 49 between the TiW coated, nickel plated ceramic window and the nickel alloy window frame. The thermal cycle is carried out in a vacuum of 0.0005 Torr or lower with a maximum leak rate of 15 microns per hour. A representative thermal cycle is described below, however it will be appreciated that the optimum cycle parameters depend on factors that include the composition of the braze alloy:

Heat to 1000 deg. F.+/−15 deg. F. at a rate of 25 deg. F./minute or slower, hold for 15 minutes;

Heat to 1500 deg. F.+/−15 deg. F. at a rate of 25 deg. F./minute or slower, hold for 15 minutes;

Heat to 1900 deg. F.+/−15 deg. F. at a rate of 25 deg. F./minute or slower, hold for 15 minutes;

Heat to a brazing temperature of 2100 deg. F.+/−15 deg. F. at a rate of 25 deg. F. per minute or slower, hold for 15 minutes;

Cool to a diffusion temperature of 1975 deg. F.+/−15 deg. F. at a rate of 10 deg. F./min or slower, hold for a diffusion time of 4 hours;

Cool to 1800 deg. F.+/−15 deg. F. at a rate of 10 deg. F./min or slower, hold for 30 minutes;

Cool to 1600 deg. F.+/−15 deg. F. at a rate of 10 deg. F./min or slower, hold for 30 minutes;

Cool to 1400 deg. F.+/−15 deg. F. at a rate of 10 deg. F./min or slower, hold for 30 minutes;

Cool to 1200 deg. F.+/−15 deg. F. at a rate of 10 deg. F./min or slower, hold for 30 minutes;

Cool to 1000 deg. F.+/−15 deg. F. at a rate of 10 deg. F./min or slower, hold for 30 minutes;

Cool to room temperature at any convenient rate.

As a result of the thermal cycle, the braze joint 49 forms to join the window to the window frame. As a result, the individual layers 44, 46, 48 as well as an optional nickel rich zone 54 (discussed below) are no longer clearly differentiated as they are in FIG. 3.

As already noted, the optimum thermal cycle depends on factors including the composition of the braze alloy. The above described cycle, which includes a brazing temperature of about 2100 deg. F., a diffusion temperature of about 1975 deg. F. and a diffusion time of about 4 hours is believed to be satisfactory when using the third suitable braze alloy with the first constituent making up about 75% to 95% of the blend and the second constituent making up the remainder of the blend. However if the amount of the first constituent is decreased toward 40% of the blend and the amount of the second constituent is increased toward 60% of the blend, a brazing temperature of about 2200 deg. F., a diffusion temperature of about 2100 to 2200 deg. F. and a diffusion time of about 5-10 hours may be more satisfactory. In general, the method described herein is believed to be satisfactory for high temperature brazing in which the brazing temperature, which is the peak temperature of the cycle, is at least about 2050 deg. F. The resulting braze joint is therefore suitable for service in high temperature environments such as the turbine module of a gas turbine engine.

The subassembly 32, which comprises a ceramic component (the microwave transparent window) joined to a nonceramic component (the nickel alloy window frame) is then installed in the opening 26 in the nonceramic (nickel alloy) outer airseal 28 and joined thereto by any suitable method, for example by brazing as indicated at 50.

The above described method may also include an optional step of preparing the nonceramic component (the nickel alloy window frame 34) prior to brazing to render the nonceramic component more compatible for being brazed to the TiW coated, metal plated (nickel plated) ceramic component. The preparatory step is preferably selected from a group of processes consisting of nickel plating and fluoride ion cleaning. The preparatory step is applied to the perimeter of the hole 40 in the window frame and results in a nickel rich zone 54 with a scarcity of elements that could, if present in higher concentrations, promote undesirable oxide formation during brazing.

Figure 4:
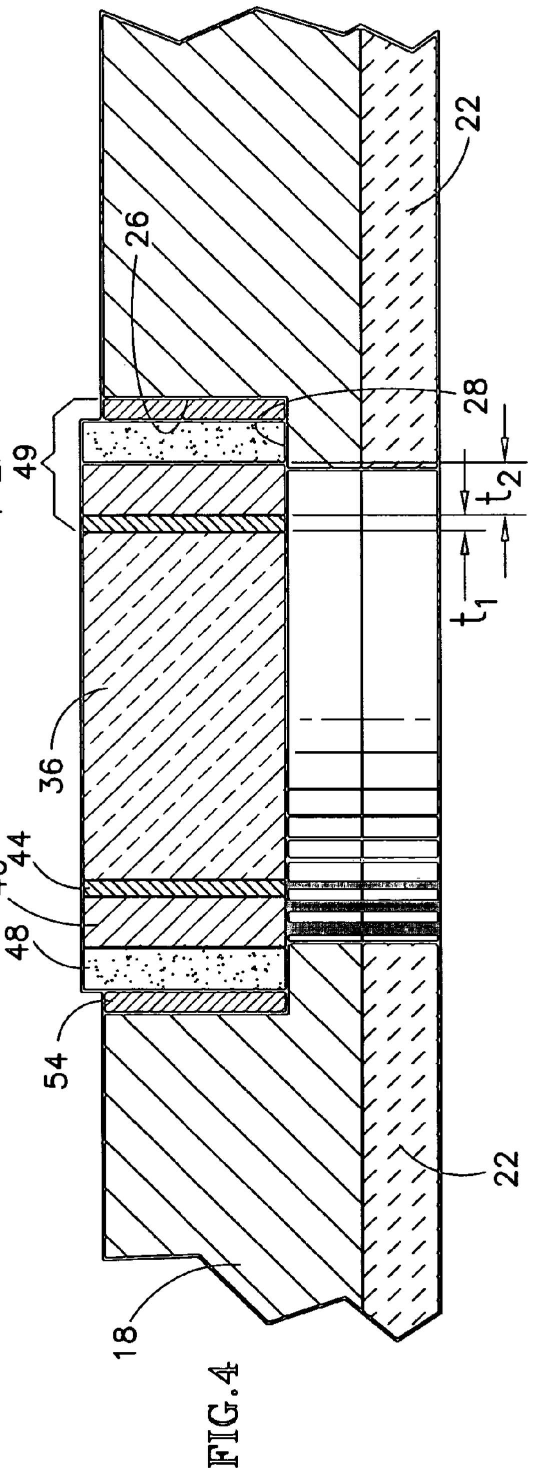
FIG. 4 is a view similar to FIG. 3 showing a configuration without the window frame.

In the above described method, and as seen in FIG. 3, the ceramic component is a window 36 and the host nonceramic component is a window frame 34. The window and window frame comprise a subassembly 32 that is subsequently joined to a second nonceramic component, the outer airseal 18. However, as seen in FIG. 4, the ceramic window 36 may be installed directly into an appropriately configured opening 26 in the nonceramic airseal, in which case the outer airseal is the host component for the window. Preferably, the opening has a shoulder 28 as shown to help radially support and locate the window, however the shoulder may be absent if desired. The method for installing the window directly into opening 26 is the same as the method already described except that the brazing step is employed to join the TiW coated, nickel plated window 36 directly to the outer airseal 18 at braze joint 49, and the optional preparatory step of nickel plating or fluoride ion cleaning is applied to the perimeter of the opening 26 in the outer airseal.

Although this disclosure refers to specific embodiments, it will be understood by those skilled in the art that various changes in form and detail may be made without departing from the subject matter set forth in the accompanying claims.

We claim:

1. A method of joining a ceramic, microwave transparent component to a nonceramic host comprising:

applying a Titanium-Tungsten (TiW) coating to the microwave transparent component;

applying a metal layer over the TiW coating; and brazing the microwave transparent component to the host, wherein the step of brazing the ceramic component to the nonceramic component includes a thermal cycle as set forth below;

heat to 1000 deg. F +/− 15 deg. F at a rate of 25 deg. F/minute or slower, hold for 15 minutes;

heat to 1500 deg. F +/− 15 deg. F at a rate of 25 deg. F/minute or slower, hold for 15 minutes;

heat to 1900 deg. F +/− 15 deg. F at a rate of 25 deg. F/minute or slower, hold for 15 minutes;

heat to a brazing temperature of 2100 deg. F +/− 15 deg. F at a rate of 25 deg. F per minute or slower, hold for 15 minutes;

cool to a diffusion temperature of 1975 deg. F +/− 15 deg. F at a rate of 10 deg. F/min or slower, hold for a diffusion time of 4 hours;

cool to 1800 deg. F +/− 15 deg. F at a rate of 10 deg. F/min or slower, hold for 30 minutes;

cool to 1600 deg. F +/− 15 deg. F at a rate of 10 deg. F/min or slower, hold for 30 minutes;

cool to 1400 deg. F +/− 15 deg. F at a rate of 10 deg. F/min or slower, hold for 30 minutes;

cool to 1200 deg. F +/− 15 deg. F. at a rate of 10 deg. F/min or slower, hold for 30 minutes;

cool to 1000 deg. F +/− 15 deg. F at a rate of 10 deg. F/min or slower, hold for 30 minutes;

cool to room temperature at any convenient rate.

* * * * *